(12) United States Patent
Govindarajan et al.

(10) Patent No.: US 12,126,549 B2
(45) Date of Patent: *Oct. 22, 2024

(54) PACKET STORAGE BASED ON PACKET PROPERTIES

(71) Applicant: TEXAS INSTRUMENTS INCORPORATED, Dallas, TX (US)

(72) Inventors: Sriramakrishnan Govindarajan, Bangalore (IN); Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,710

(22) Filed: Jul. 24, 2023

(65) Prior Publication Data

US 2024/0022528 A1 Jan. 18, 2024

Related U.S. Application Data

(63) Continuation of application No. 17/122,215, filed on Dec. 15, 2020, now Pat. No. 11,750,534.

(30) Foreign Application Priority Data

Dec. 27, 2019 (IN) .............................. 201941054229

(51) Int. Cl.
*H04L 49/90* (2022.01)
*H04L 49/109* (2022.01)
(Continued)

(52) U.S. Cl.
CPC ........ *H04L 49/9042* (2013.01); *H04L 49/109* (2013.01); *H04L 67/568* (2022.05); *H04L 69/22* (2013.01)

(58) Field of Classification Search
CPC .... H04L 49/9042; H04L 67/568; H04L 69/22
See application file for complete search history.

(56) References Cited

U.S. PATENT DOCUMENTS 6,246,683 B1 6/2001 Connery et al.
7,757,033 B1 7/2010 Mehrotra et al.
(Continued)

FOREIGN PATENT DOCUMENTS

CN 108476208 8/2018

*Primary Examiner* — Samina F Choudhry
(74) *Attorney, Agent, or Firm* — Michael T. Gabrik; Frank D. Cimino (57) ABSTRACT

In an example, a system includes a network port that receives a packet; a first memory; a second memory; and a packet analyzer coupled to the network port. The packet analyzer operates to divide the packet into multiple fragments, analyze each of the multiple fragments to determine whether the corresponding fragment has a first priority level or a second, lower, priority level, determine whether to store each of the multiple fragments in the first memory or the second memory based on the priority level determined for that fragment, store each fragment determined to have the first priority level in the first memory, and store each fragment determined to have the second priority level in the second memory. The network port, packet analyzer and the first memory, which may be a cache memory, may be embodied on a chip, and the second memory may be external to the chip.

20 Claims, 4 Drawing Sheets

(51) Int. Cl.
    *H04L 67/568*        (2022.01)
    *H04L 69/22*         (2022.01)

(56) References Cited

U.S. PATENT DOCUMENTS

| | | | |
|---|---|---|---|
| 2005/0135419 A1* | 6/2005 | Pullen | H04L 49/3072 |
| | | | 370/473 |
| 2014/0036930 A1 | 2/2014 | Lih et al. | |
| 2014/0164553 A1 | 6/2014 | Gill et al. | |
| 2017/0223153 A1* | 8/2017 | Johnsen | H04L 69/22 |
| 2018/0287935 A1* | 10/2018 | Wang | H04L 12/4625 |
| 2019/0087352 A1 | 3/2019 | Lee et al. | |

* cited by examiner

PACKET STORAGE BASED ON PACKET PROPERTIES

CROSS-REFERENCE TO RELATED APPLICATIONS

The present application claims priority under 35 U.S.C. § 120 to U.S. application Ser. No. 17/122,215, filed Dec. 15, 2020, which claims priority under 35 U.S.C. § 119 to India Provisional Patent Application No. 201941054229, filed Dec. 27, 2019, each of which is incorporated by reference in its entirety.

SUMMARY

In an example, a system includes a network port that receives a packet; a first memory; a second memory; and a packet analyzer coupled to the network port. The packet analyzer operates to divide the packet into multiple fragments, analyze each of the multiple fragments to determine whether the corresponding fragment has a first priority level or a second, lower, priority level, determine whether to store each of the multiple fragments in the first memory or the second memory based on the priority level determined for that fragment, store each fragment determined to have the first priority level in the first memory, and store each fragment determined to have the second priority level in the second memory. The network port, packet analyzer and the first memory, which may be a cache memory, may be embodied on a chip, and the second memory may be external to the chip.

In an example, a method includes receiving multiple packets; assigning a flow identifier to each packet based on content in a portion of that packet; determining whether to divide each packet based on the respective flow identifier; dividing a first packet of the multiple packets into fragments based on the flow identifier of the first packet; maintaining a second packet of the multiple packets in undivided form based on the flow identifier of the second packet; determining whether each fragment of the first packet has a first priority level or a second priority level that is lower than the first priority level; providing each fragment of the first packet having the first priority level to a first hardware queue; and providing each fragment of the first packet having the second priority level to a second hardware queue. Each fragment of the first packet having the first priority level may be stored in a first memory region, e.g., of a cache memory, and each fragment of the first packet having the second priority level may be store in a second memory region, e.g., of a non-cache memory.

DETAILED DESCRIPTION

A system on chip (SOC) is a chip that integrates some or all of the components of a computer or other electronic system. SOCs are often capable of communicating with other devices over a network by exchanging packets with such devices. Outgoing packets are transmitted and incoming packets are received via a network interface integrated into the SOC. Generally, the network interface stores all incoming packets to a memory external to the SOC. After the incoming packets are stored to memory, a processor core executing an application on the SOC accesses the packets from the memory and uses the packets as may be appropriate.

Such SOCs are inefficient because of their heavy reliance on accesses to external memory, which are slow and inefficient, to store and access packets. To improve efficiency, some SOCs include network interfaces that store incoming packets to caches, such as processor core caches or centralized caches shared by multiple processor cores. Network interfaces are able to store incoming packets to caches faster than they are able to store incoming packets to memory external to the SOC. Similarly, processor cores are able to access packets stored in caches more quickly than they are able to access the packets from external memory. Because the network interfaces and the processor cores interact primarily with the caches to store and retrieve packets, the number of memory accesses is reduced and efficiency is improved. This approach may be useful in enterprise systems, where caches may be of large size. However, in embedded systems (e.g., automobile applications), cache sizes are limited, and it is impractical, if not impossible, to store all incoming packets to a cache.

The common trait shared by both of the disadvantageous approaches described above is the rigid and uniform treatment of all incoming packets. In the approaches above, all incoming packets are either stored to external memory, or all incoming packets are stored to processor core caches. In contrast, this disclosure describes examples of an SOC that is configured to analyze various properties of incoming packets and to store the incoming packets based on this analysis. As a result, the SOC may store some incoming packets to memory, but the SOC may also store some incoming packets to a centralized cache shared among processor cores on the SOC. In some examples, the SOC may divide incoming packets into multiple fragments and may store different fragments from a single packet to different locations. The SOC may, for example, store to the cache only those fragments that are likely to be useful to an application executing on a processor core, and the SOC may store the remaining packets or fragments to memory. By judiciously processing incoming packets based on an analysis of packet properties, the efficiency of the SOC is increased in a manner that does not overrun the cache and thus is practical for embedded applications.

Figure 1:
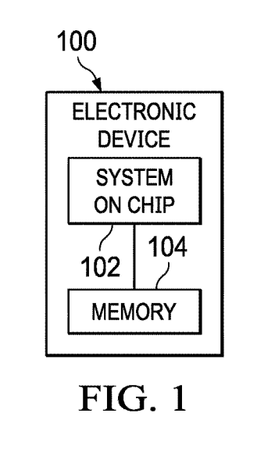
FIG. 1 is a block diagram of an electronic device configured to store packets based on packet properties, in accordance with various examples.

FIG. 1 is a block diagram of an electronic device 100 configured to store packets based on packet properties, in accordance with various examples. The electronic device 100 may be, for example, an automobile or part of an automobile such as an electronic control unit (ECU), a personal computer, a workstation, a tablet, an entertainment device (e.g., a television or audio device), a home appliance, or any other embedded or otherwise resource-limited system. The electronic device 100 may include a system on chip (SOC) 102 and an external memory 104 that is coupled to and external to the SOC 102. In examples, the SOC 102 and external memory 104 may be co-located on a system board, although the scope of disclosure is not limited as such. As described below, the SOC 102 is configured to judiciously process and store incoming data packets based on properties of those packets. For example, the SOC 102 may include a network switch that is configured to receive a packet and to identify a flow identifier (ID) corresponding to a header of the packet. In addition, the SOC 102 may include a direct memory access (DMA) controller that is configured to divide the packet into first and second fragments based on the flow ID and to assign a first hardware queue to the first fragment and a second hardware queue to the second fragment. The DMA controller may further be configured to assign memory regions (e.g., regions of a memory on the SOC) to the first and second fragments based on the first and second hardware queues. The SOC 102 also may include a region-based attribute generator (RBAG), which may be a standalone hardware component or be integrated with a memory management unit (MMU) such as an input-output MMU (IOMMU) that performs some or all of the functions attributed herein to the RBAG. The RBAG is configured to generate a cache allocation command (also referred to herein as an "attribute") based on the memory region assigned to the first fragment. Responsive to the cache allocation command, a cache (e.g., a snoopy cache) of the SOC 102 stores the first fragment to the cache or to memory (e.g., external memory 104) Likewise, the RBAG may generate a cache allocation command (or "attribute") based on the memory region assigned to the second fragment. Responsive to the cache allocation command, the cache stores the second fragment to the cache or to memory (e.g., external memory 104). These hardware features and their associated functions are described in detail below.

Figure 2:
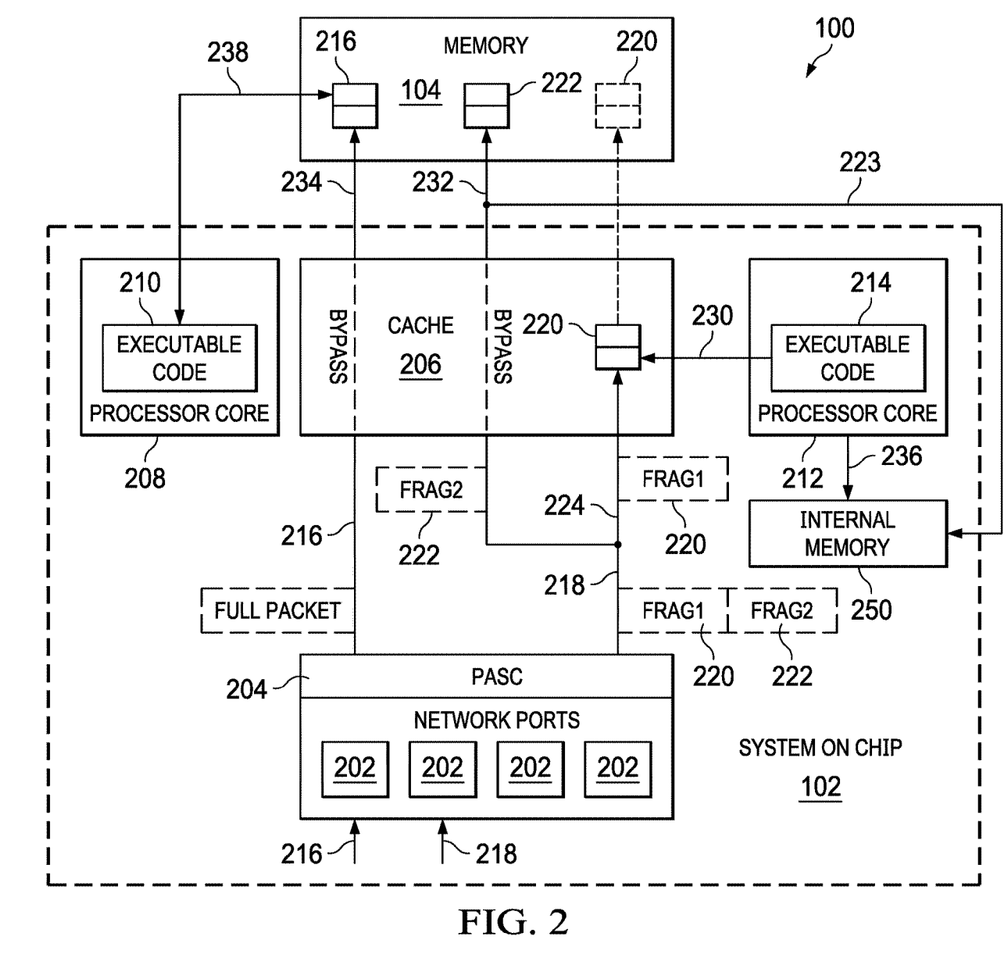
FIG. 2 is a schematic diagram of an electronic device configured to store packets based on packet properties, in accordance with various examples.

FIG. 2 is a schematic diagram of the electronic device 100 in accordance with various examples. FIG. 2 depicts structural and functional features of the electronic device 100 without necessarily depicting the structural connections that may exist between the structural features. The electronic device 100 includes the SOC 102 and the external memory 104 (e.g., volatile random access memory (RAM)) coupled to the SOC 102. The SOC 102 includes network ports 202 and packet analysis and storage circuitry (PASC) 204. The PASC 204 may include, for example, the network switch, DMA controller, and RBAG described above and described in further detail below. The PASC 204 is configured to access a cache 206 and the external memory 104. The SOC 102 further includes a processor core 208 executing executable code 210 (e.g., an application) and a processor core 212 executing executable code 214 (e.g., an application). The SOC 102 may include additional processor cores. FIG. 2 depicts the executable codes 210, 214 as being within the processor cores 208, 212 to indicate that the processor cores 208, 212 execute the executable codes 210, 214. However, in examples, the executable codes 210, 214 are stored in a memory or other suitable storage outside of the processor cores 208, 212. The processor cores 208, 212 are configured to access the shared cache 206 and the external memory 104. Accordingly, the cache 206 and the external memory 104 are shared among the processor cores 208, 212 and other processor core(s) that may be included in the SOC 102. The processor cores 208, 212 may include other caches (e.g., L1, L2 caches) that are internal to the processor cores 208, 212 and that are not shared with other processor cores. The SOC 102 also may include internal memory 250.

In operation, the network ports 202 receive packets 216, 218 from a network, which may be any suitable type of network (e.g., networks within the electronic device 100, networks between multiple electronic devices, the Internet). The PASC 204 receives the packets 216, 218, analyzes the packets 216, 218 as described below, optionally divides the packet(s) 216, 218 into fragments as described below, and then judiciously stores the packet(s) 216, 218 and/or the fragments to either the cache 206 and/or memory (e.g., external memory 104, internal memory 250), depending on the priority level of each packet or fragment. Thus, for example, the PASC 204 may analyze the header of the packet 216 and determine that the packet 216 is a low-priority packet that does not need to be accessed frequently or quickly by the processor cores 208, 212 (e.g., the executable codes 210, 214 do not call for low-latency access to the packet 216). For instance, the executable codes 210, 214 may perform safety features in the example where electronic device 100 is an automobile, and the packet 216 may not be highly useful or relevant to the implementation of these safety features by the executable codes 210, 214. Accordingly, the PASC 204 may store the low-priority packet 216 directly to external memory 104, such as via a direct memory access (DMA), as numeral 234 indicates.

The PASC 204 may similarly analyze the header of the packet 218 and determine that the packet 218, or at least a portion of the packet 218, is highly useful or relevant to the executable codes 210 and/or 214 executing on the processor cores 208, 212 and should be available for low-latency access by the processor cores 208, 212. Accordingly, it may be beneficial to store the high-priority packet 218 to the cache 206 instead of, or in addition to, the external memory 104. However, not all parts of the packet 218 may be highly useful to the executable codes 210, 214, and thus storing the entire packet 218 to the cache 206 may be an inefficient use of storage space on the cache 206, particularly in a resource-limited embedded system. Thus, upon determining that the packet 218 contains highly useful data for the executable codes 210, 214, the PASC 204 may be configured to determine whether the entire packet 218 is highly useful or only a portion of the packet 218 is highly useful. If the entire packet 218 is highly useful, the PASC 204 may store the entire packet 218 to the cache 206. However, if only a portion of the packet 218 is highly useful, the PASC 204 may divide the packet 218 into two or more fragments, such as fragments 220, 222. If the PASC 204 divides the packet 218 into fragments 220, 222 to separate the portions of the packet 218 that are and are not highly useful to the executable codes 210, 214, the PASC 204 may then store the highly useful, high-priority fragment 220 to the cache 206 and may store the less useful, low-priority fragment 222 to external memory 104 and/or internal memory 250, as numerals 224, 232, and 223 respectively indicate. In examples, the fragment 220 may also be stored in the external memory 104 for redundancy. The processor core 208 executing the executable code 210 may subsequently access the packet 216 from the external memory 104 (as numeral 238 indicates), indicating that low-priority packets may still be useful to executable code 210, but just not to the degree that justifies storing the packet 216 in the low-latency cache 206. Similarly, the processor core 212 executing the executable code 214 may access the fragments 220, 222 from the cache 206 and the internal memory 250, respectively, as numerals 230, 236 indicate. In this way, the PASC 204 judiciously stores high-priority fragments of high-priority packets to the cache 206 and stores low-priority packets and/or low-priority fragments to the external memory 104, thereby increasing the efficiency of cache usage in resource-constrained embedded systems like the SOC 102. In addition, this judicious storage of packets and fragments is useful in certain forwarding and/or filtering applications. In some such applications, only a fragment of a given packet is accessed by a processor core and is thus stored to the cache 206, and the remainder of the packet is not accessed by the processor core and is thus stored to external memory 104. After the packet contents (e.g., the fragment) have been used by the processor core, the PASC 204 may fetch the fragment from the cache and the remainder of the packet from the external memory 104 to reconstruct the full packet and forward it to the next destination. This process is transparent to the direct memory access (DMA) capability of the PASC 204, as the PASC 204 may already be configured to first access the cache 206 for content and to subsequently and automatically access the external memory 104 if the content is not in the cache 206.

Figure 3:
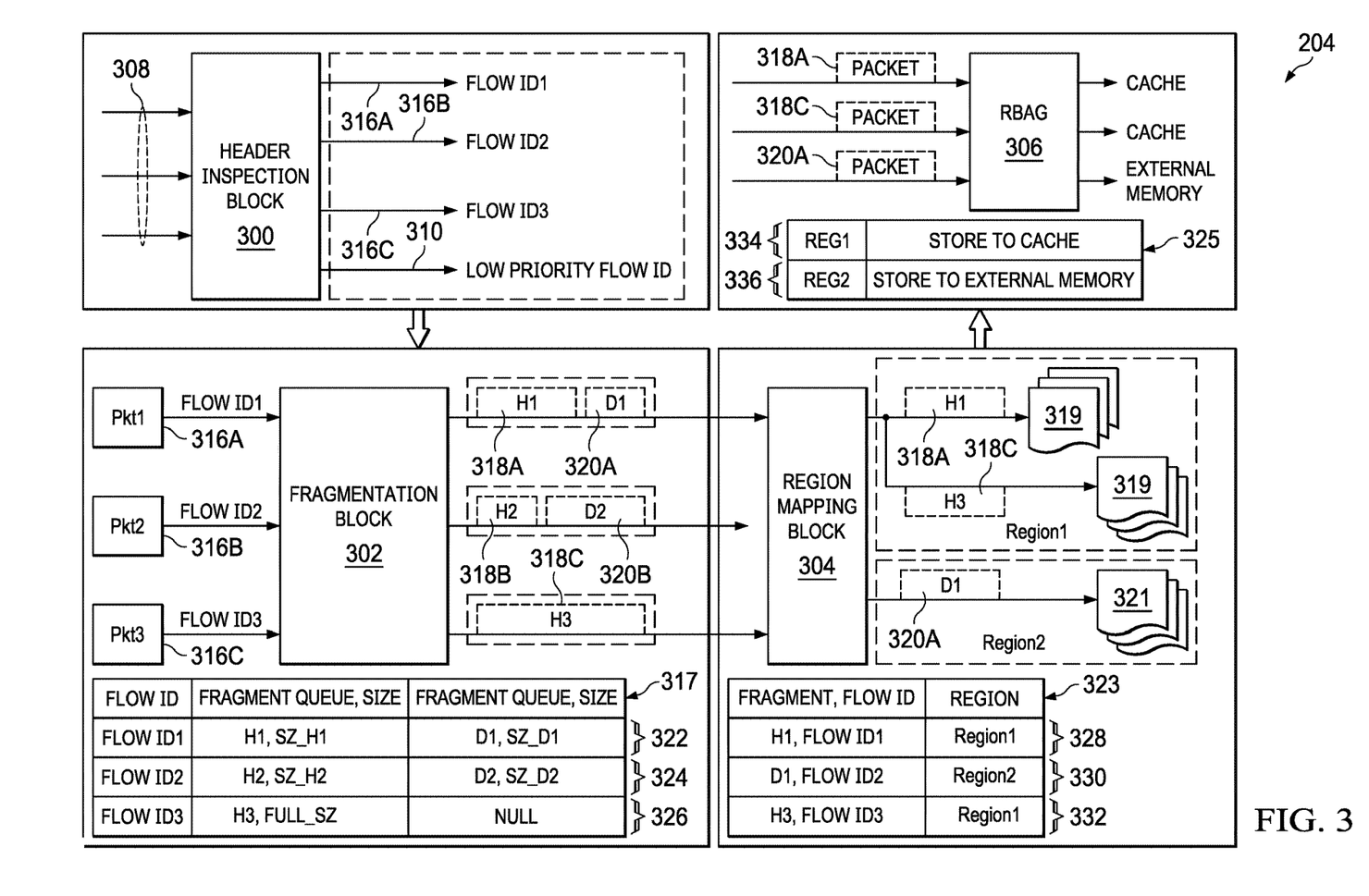
FIG. 3 is a conceptual schematic diagram of a system on chip (SOC) configured to store packets based on packet properties, in accordance with various examples.

FIG. 3 is a conceptual schematic diagram of the system on chip (SOC) 102 (and more specifically, the PASC 204) configured to store packets based on packet properties, in accordance with various examples. The components shown in FIG. 3 are functional features, and not structural features, of the PASC 204. Structural features of the PASC 204 and their relationships to the functional features that FIG. 3 depicts are described below. More specifically, the PASC 204 includes a header inspection block 300. The functions of the header inspection block 300 described herein may be performed by, e.g., a hardware network switch, as described below. The PASC 204 also includes a fragmentation block 302. The functions of the fragmentation block 302 described herein may be performed by, e.g., a hardware DMA controller, as described below. The PASC 204 also includes a region mapping block 304. The functions of the region mapping block 304 described herein may be performed by, e.g., the hardware DMA controller, as described below. The PASC 204 may also include a RBAG 306. The functions of the RBAG 306 described herein may be performed by, e.g., a hardware RBAG, as described below.

In operation, the header inspection block 300 is configured to receive incoming packets 308 (numeral 308 does not represent any specific number or type of packets). The header inspection block 300 inspects the headers of the packets 308. The header inspection block 300 may include a lookup table or other hardware and/or software feature that enables the header inspection block 300 to determine whether the header being inspected indicates that the corresponding packet 308 is a high-priority packet or a low-priority packet. As described above, some or all of a high-priority packet should be available for low-latency access by a processor core, for example, from a cache. Conversely, as described above, a low-priority packet (or low-priority fragment) is not useful enough to an application being executed by a processor core to justify storage in the cache, and thus such a low-priority packet (or fragment) may be stored in memory. Such a lookup table or other feature may be programmed by any suitable entity, including by a processor core on the SOC 102 executing an application, for example.

Based on this analysis of the header of each packet 308, the header inspection block 300 assigns a flow identifier (ID) to each packet 308. In examples, the header inspection block 300 is configured to parse the packet header and to use a set of programmed rules in conjunction with the header contents to generate a flow ID. The header inspection block 300 causes low-priority packets to be stored to memory (e.g., external memory 104) as low priority packets 310 by assigning them any of a set of flow IDs designated for low-priority packets. In contrast, high-priority packets 316A-316C are assigned differing flow IDs FLOW ID1, FLOW ID2, and FLOW ID3, respectively. Packets subsequently received also may be assigned any of these three flow IDs or other flow IDs. The flow IDs may be digital bit strings, for example.

As described above, a high-priority packet includes data that is useful enough to application(s) being executed by a SOC 102 processor core that the data should be accessible with low latency. However, not all portions of a high-priority packet are necessarily high-priority. For example, a high-priority packet may be identified as high-priority when a small portion of the packet is high-priority and the remainder of the packet is low-priority. In such cases, the high-priority packet is divided into fragments, with the high-priority fragment(s) being stored to the cache and the low-priority fragment(s) being stored to memory. Accordingly, the fragmentation block 302 is configured to receive the high-priority packets 316A-316C along with their flow IDs and to divide the high-priority packets 316A-316C according to their flow IDs. The fragmentation block 302 includes a lookup table or other suitable hardware and/or software that indicates how all high-priority packets bearing FLOW ID1, FLOW ID2, or FLOW ID3 should be divided and to which hardware queues they should be provided for subsequent processing. For example, lookup table 317 indicates that each high-priority packet bearing FLOW ID1 should be divided into a high-priority fragment of size SZ_H1 and a low-priority fragment of size SZ_D1 (numeral 322). The high-priority fragment is provided to a hardware queue H1, and the low-priority fragment is provided to a hardware queue D1. For example, lookup table 317 indicates that each high-priority packet bearing FLOW ID2 should be divided into a high-priority fragment of size SZ_H2 and a low-priority fragment of SZ_D2 (numeral 324). The high-priority fragment is provided to a hardware queue H2 and the low-priority fragment is provided to a hardware queue D2. For example, lookup table 317 indicates that each high-priority packet bearing FLOW ID3 should not be divided, and that the entire high-priority packet bearing FLOW ID3 is high-priority (numeral 326). The high-priority packet is provided to a hardware queue H3 and includes all portions of the packet (hence the size FULL_SZ indicated by numeral 326).

Accordingly, the fragmentation block 302 receives the high-priority packet 316A and divides the packet into high-priority fragment 318A (assigned to hardware queue H1) and low-priority fragment 320A (assigned to hardware queue D1). In examples, packets may be divided into fragments along header and data payload lines, e.g., the header may be the first fragment and the data payload may be the second fragment. The fragmentation block 302 receives the high-priority packet 316B and divides the packet into high-priority fragment 318B (assigned to hardware queue H2) and low-priority fragment 320B (assigned to hardware queue D2). The fragmentation block 302 receives the high-priority packet 316C and leaves the packet undivided, providing the high-priority packet 316C as high-priority packet 318C assigned to hardware queue H3. For simplicity and ease of reference, this description may refer to the undivided, high-priority packet 318C as a fragment 318C.

The region mapping block 304 is configured to receive the fragments provided by the fragmentation block 302 and to assign memory regions and/or buffer regions to each of the received fragments. In examples, the region mapping block 304 assigns a memory region to a fragment based on the hardware queue assigned to that fragment, and it assigns the buffer to the fragment based on the flow ID of the packet from which that fragment was produced. The region mapping block 304 may use a lookup table 323 (e.g., programmed by any suitable entity) to assign memory regions and/or packet buffers to incoming fragments. The memory regions may be regions of a memory located on the SOC 102, such as the internal memory 250 described below with reference to FIG. 4. In some examples, the memory regions may be regions of the external memory 104. In some examples, the memory regions may be in both the internal memory 250 and the external memory 104. The buffers may be buffers inside such memories. In this way, the region mapping block 304 is able to flexibly store fragments to faster internal memory 250, the external memory 104, or a combination thereof. As described below, the identity of the specific memory region to which a fragment is stored may later be used to determine whether the fragment is to be stored in the cache 206. In examples where the internal memory 250 is not used to store fragments, specific memory regions in the external memory 104 may be designated for buffers used to store non-cached low- and/or high-priority fragments, with the remaining high-priority fragments being cached in the cache 206. In other examples where the internal memory 250 is used to store fragments, low- and/or high-priority fragments may be stored in buffers in the internal memory 250 while other low- and/or high-priority fragments may be stored in buffers in the external memory 104. Irrespective of which of the internal memory 250 and/or external memory 104 are used, the region mapping block 304 may designate specific memory region(s) to store high-priority fragments that may, in turn, be cached in the cache 206 for efficient access. In the event cache allocation is not possible, the internal memory 250 and/or external memory 104 may be used as an alternative.

For example, the region mapping block 304 may receive the fragment 318A. Based on fragment 318A's assigned hardware queue of H1, the region mapping block 304 may assign the fragment 318A to Region 1 (numeral 319) of the memory, as numeral 328 of lookup table 323 indicates. In addition, based on the FLOW ID1 associated with the fragment 318A, the region mapping block 304 may assign the fragment 318A to a particular buffer within the memory, as numeral 328 of lookup table 323 indicates.

The region mapping block 304 may receive the fragment 320A. Based on the assigned hardware queue D1, the region mapping block 304 may assign the fragment 320A to Region 2 (numeral 321) of the memory, as numeral 330 of lookup table 323 indicates. In addition, based on the FLOW ID1 associated with the fragment 320A, the region mapping block 304 may assign the fragment 320A to a particular buffer within the memory, as numeral 330 of lookup table 323 indicates.

The region mapping block 304 may receive the fragment 318C. Based on the assigned hardware queue H3, the region mapping block 304 may assign the fragment 318C to Region 1 (numeral 319) of the memory, as numeral 332 of lookup table 323 indicates. In addition, based on the FLOW ID3 associated with the fragment 318C, the region mapping block 304 may assign the fragment 318C to a particular buffer within the memory, as numeral 332 of lookup table 323 indicates. The region mapping block 304 may process other fragments, such as fragments 318B and 320B, in a similar manner.

The memory region allocations described above determine whether the RBAG 306 will generate cache allocation commands inspected by the cache 206 (e.g., a snoopy cache) and that cause the cache 206 to store a particular fragment to the cache or to internal and/or external memory (e.g., internal memory 250, external memory 104). A lookup table 325 (e.g., programmed by any suitable entity) may indicate whether a fragment assigned to a particular memory region should be stored to the cache or the memory. For example, numeral 334 indicates that assignment of a fragment to Region 1 of memory corresponds to storage of the fragment to the cache, and numeral 336 indicates that assignment of a fragment to Region 2 of memory corresponds to storage of the fragment to the external memory 104. Accordingly, responsive to the RBAG 306 receiving the fragment 318A (or an identifier or a reference to a memory location of the fragment 318A) along with an indication of Region 1, the RBAG 306 may use the lookup table 325 to determine that the fragment 318A should be stored to the cache, because the fragment 318A corresponds to Region 1 of memory (numeral 319). In making this determination, the RBAG 306 need not examine the fragment 318A, as the region allocation may be sufficient to determine whether the fragment 318A should be stored to the cache. Similarly, responsive to the RBAG 306 receiving the fragment 318C (or an identifier or a reference to a memory location of the fragment 318C) along with an indication of Region 1, the RBAG 306 may use the lookup table 325 to determine that the fragment 318C should be stored to the cache, because the fragment 318C corresponds to Region 1 of memory (numeral 319). Likewise, responsive to the RBAG 306 receiving the fragment 320A (or an identifier or a reference to a memory location of the fragment 320A) along with an indication of Region 2, the RBAG 306 may use the lookup table 325 to determine that the fragment 320A should be stored to the external memory, because the fragment 320A corresponds to Region 2 of memory (numeral 321). The remaining fragments may be assigned to either the cache or the external memory in a similar manner.

Upon determining that a fragment should be stored to the cache or memory, the RBAG 306 may issue allocation commands with that fragment or a reference or identifier for that fragment, thereby causing the fragment to be stored in the cache or the memory. As described above, in some examples, the cache 206, which is a centralized system cache for the SOC 102 and is shared by multiple processor cores (e.g., processor cores 208, 212) and/or multiple peripherals, may include snooping logic and thus may be referred to as a snoopy cache 206. In some such examples, the cache 206 may inspect allocation commands from the RBAG 306 and may perform specific actions (e.g., storing a fragment to the cache 206, or not storing the fragment to the cache 206 and instead storing the fragment to internal memory 250 or external memory 104) responsive to the cache allocation commands generated by the RBAG 306. As described above, in some examples, a packet or fragment stored to the cache may also be stored to memory (e.g., for redundancy purposes, or if cache space cannot be allocated).

Figure 4:
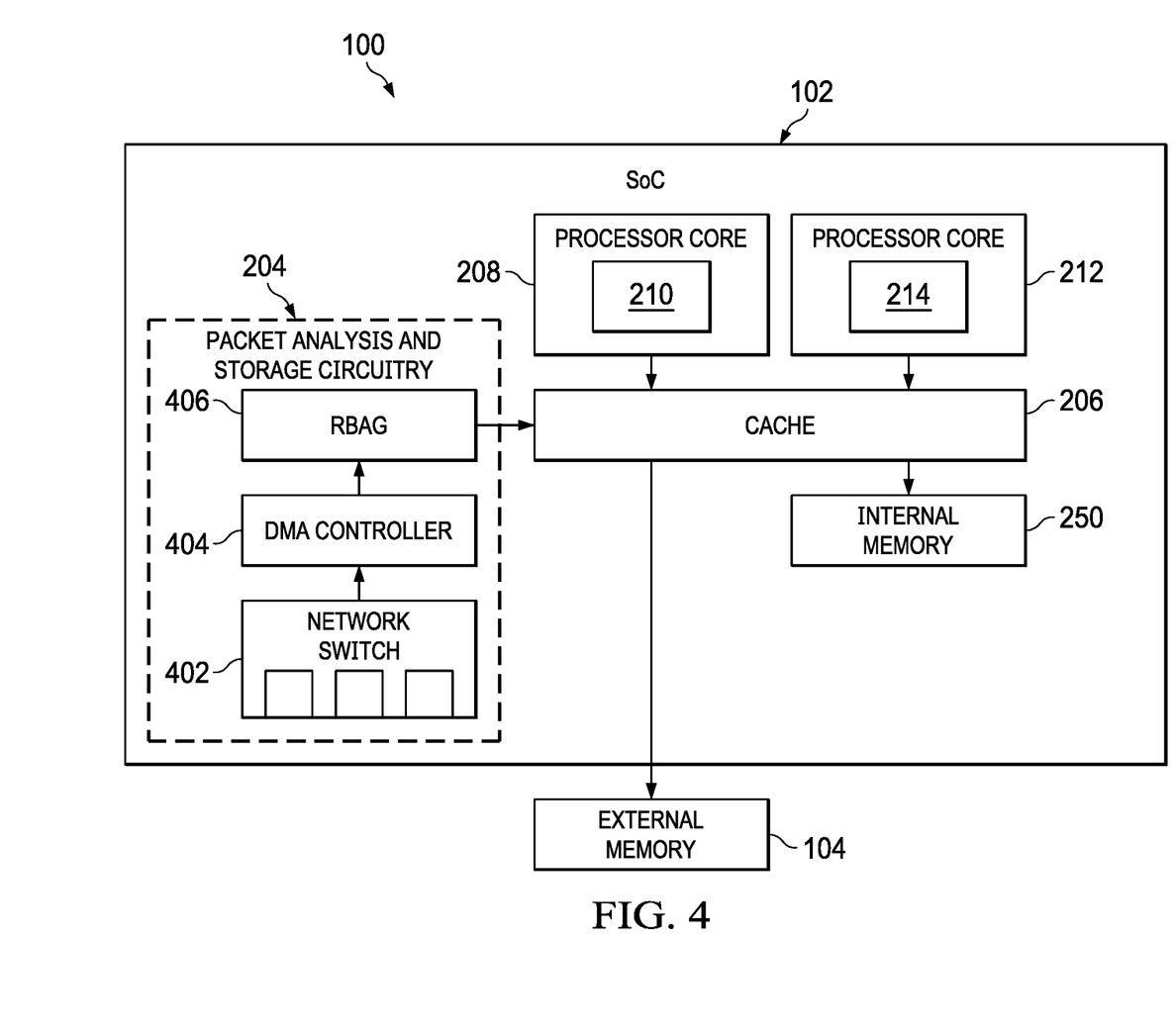
FIG. 4 is a block diagram of an electronic device configured to store packets based on packet properties, in accordance with various examples.

FIG. 4 is a block diagram of example hardware components of the electronic device 100, which includes the SOC 102 and the external memory 104. In examples, the SOC 102 includes the PASC 204, the processor cores 208 and 212 executing executable codes 210, 214, respectively, the system cache 206 shared by the processor cores 208, 212, and the internal memory 250. The PASC 204 includes a network switch 402 (e.g., an Ethernet switch), a DMA controller 404 coupled to the network switch 402, and an RBAG 406 coupled to the DMA controller 404. In operation, the network switch 402 is configured to perform the actions attributed herein to the header inspect block 300 of FIG. 3. The DMA controller 404 is configured to perform the actions attributed herein to the fragmentation block 302 and the region mapping block 304. The RBAG 406 is configured to perform the actions attributed herein to the RBAG 306. In some examples, Regions 1 and 2 (numerals 319, 321) of memory may be allocated in the internal memory 250.

Figure 5:
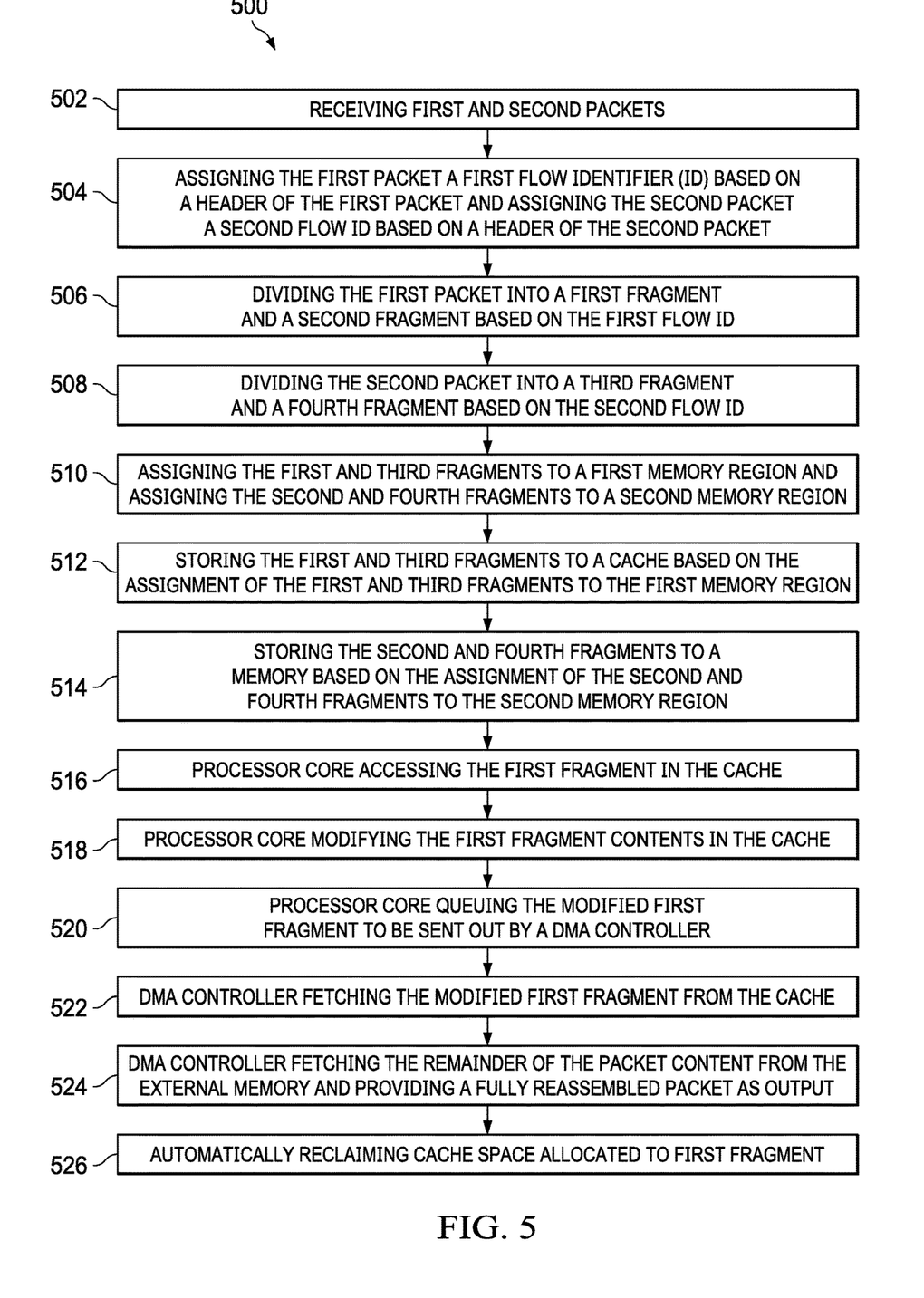
FIG. 5 is a flow diagram of a method for storing packets based on packet properties, in accordance with various examples.

FIG. 5 is a flow diagram of a method 500 for storing packets based on packet properties, in accordance with various examples. The method 500 includes receiving first and second packets, for example, as described above with reference to the header inspection block 300 and the network switch 402 (502). The method 500 includes assigning the first packet a first flow identifier (ID) based on a header of the first packet and assigning the second packet a second flow ID based on a header of the second packet, for example, as described above with reference to the header inspection block 300 and the network switch 402 (504).

The method 500 includes dividing the first packet into a first fragment and a second fragment based on the first flow ID, for example, as described above with reference to the fragmentation block 302 and the DMA controller 404 (506). The method 500 includes dividing the second packet into a third fragment and a fourth fragment based on the second flow ID, for instance, as described above with reference to the fragmentation block 302 and the DMA controller 404 (508). The method 500 includes assigning the first and third fragments to a first memory region and assigning the second and fourth fragments to a second memory region, for example, as described above with reference to the region mapping block 304 and the DMA controller 404 (510). The method 500 includes storing the first and third fragments to a cache based on the assignment of the first and third fragments to the first memory region, for example, as described above with reference to the RBAG 306 and the RBAG 406 (512). The method 500 includes storing the second and fourth fragments to a memory based on the assignment of the second and fourth fragments to the second memory region, for example, as described above with reference to the RBAG 306 and the RBAG 406 (514).

Further, the method 500 may include reassembly of the fragments, whether modified or unmodified, prior to the fragment being provided to another electronic device, system, or network, and the subsequent automatic reclaiming of any cache space occupied by such fragment(s). For example, the method 500 may include a processor core accessing the first fragment in the cache (516). The method 500 includes the processor core modifying the first fragment contents in the cache (518). The method 500 includes the processor core queuing the modified first fragment to be sent out (e.g., provided to another electronic device, system, or network) by a DMA controller (520). The method 500 includes the DMA controller fetching the modified first fragment from the cache (522). The method 500 includes the DMA controller fetching the remainder of the packet content from the external memory and providing a fully reassembled packet, including the modified first fragment and the remainder of the packet content, as output (524). The method 500 may also include automatically reclaiming the cache space allocated to the first fragment (526). The steps of the method 500 may be performed in any suitable order and may be modified as may be suitable, including by the addition, deletion, rearrangement, or modification of one or more steps.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means +/−10 percent of the stated value. Modifications are possible in the described examples, and other examples are possible within the scope of the claims.

What is claimed is:

1. A system comprising:
   network ports configured to receive packets;
   a first memory;
   a second memory; and
   circuitry configured to, for each packet received, inspect a portion of the packet, determine whether the packet has a first priority level or a second priority level that is lower than the first priority level, and assign a flow identifier to the packet, the circuitry further configured to, for each packet identified as having the first priority level, determine whether to divide the packet into multiple fragments, divide each first priority level packet determined to be divided into multiple fragments, analyze each of the multiple fragments to determine whether the corresponding fragment has the first priority level or the second priority level, determine whether to store each of the multiple fragments in the first memory or the second memory based on the priority level determined for that fragment, store each fragment determined to have the first priority level in the first memory, and store each fragment determined to have the second priority level in the second memory.

2. The system of claim 1, wherein the system includes a processor core, and the second memory is external to and accessible by the processor core.

3. The system of claim 1, further comprising a network switch that includes the network ports, each network port configured to receive a respective packet.

4. The system of claim 3, wherein the circuitry includes an inspection component configured to inspect the portion of each packet received by the network ports, and based on the inspection of the portion of each received packet:

determine whether that packet has the first priority level or the second priority level, and assign the flow identifier to that packet.

5. The system of claim 4, wherein the circuitry includes a fragmentation component configured to receive each packet identified as having the first priority level and the corresponding flow identifier, determine whether to divide each first level priority packet into fragments, divide each first level priority packet determined to be divided into fragments, determine whether each fragment has the first priority level or the second priority level, and assign a hardware queue of multiple hardware queues to which each fragment is to be provided based on the priority level of that fragment.

6. The system of claim 5, wherein the fragmentation component is further configured to determine which of the multiple hardware queues each undivided first level priority packet is to be provided.

7. The system of claim 5, wherein the circuitry includes a region mapping component configured to receive the fragments determined by the fragmentation component and assign a memory region to each fragment based on at least one of the hardware queue assigned to that fragment and the flow identifier associated with that fragment.

8. The system of claim 4, wherein the flow identifier assigned to each packet is based on a latency with which a processor core in the system is to access contents of that packet.

9. The system of claim 7, wherein the first memory is a cache memory, and the circuitry includes a region-based attribute generator configured to generate allocation commands for inspection by the cache memory.

10. The system of claim 9, wherein the allocation commands indicate that each fragment having the first priority level is to be stored in the cache memory.

11. A system comprising:
a network switch including multiple ports, each configured to receive a packet, the network switch configured to inspect each packet received by the ports, and, based on the inspection, for each packet received, determine whether the packet has a first priority level or a second priority level and assign a corresponding flow identifier to the packet, the first priority level being a higher priority level than the second priority level;
a direct memory access (DMA) controller coupled to the network switch, the DMA controller configured to determine whether to divide each packet having the first priority level based on the flow identifier of that packet, for each packet determined to be divided, divide that packet into fragments, each having the first priority level or the second priority level, and assign a hardware queue of multiple hardware queues to which each fragment is to be provided based on the priority level of that fragment; and
a region-based attribute generator (RBAG) coupled to the DMA controller, the RBAG configured to receive the fragments and assign a memory region to each fragment based on at least one of the hardware queue assigned to that fragment and the flow identifier associated with that fragment.

12. The system of claim 11, further comprising:
a cache memory coupled to the RBAG and configured to store fragments having the first priority level; and
a memory configured to store packets having the second priority level and to store fragments having the second priority level.

13. The system of claim 12, further comprising a processor core configured to access fragments stored in the cache memory at a first latency and configured to access packets and fragments stored in the memory at second latency that is longer than the first latency.

14. The system of claim 11, wherein the network switch is configured to inspect a header of each packet received by the ports.

15. The system of claim 11, further comprising first and second memories, wherein the RBAG is configured to generate an allocation command for each fragment based on the memory region assigned to that fragment, the allocation command indicating whether the corresponding fragment is to be stored in the first memory or the second memory.

16. The system of claim 15, wherein the first memory is a cache memory, and the allocation command for each fragment having the first priority level directs that fragment to be stored in the cache memory.

17. A method comprising:
receiving multiple packets;
assigning a flow identifier to each packet based on content in a portion of that packet;
determining whether to divide each packet based on the respective flow identifier;
dividing a first packet of the multiple packets into fragments based on the flow identifier of the first packet;
determining that the entirety of a second packet of the multiple packets has a first priority level based on the flow identifier of the second packet;
maintaining the second packet in undivided form based on the flow identifier of the second packet;
determining whether each fragment of the first packet has the first priority level or a second priority level that is lower than the first priority level;
providing each fragment of the first packet having the first priority level to a first hardware queue;
providing each fragment of the first packet having the second priority level to a second hardware queue; and
providing the second packet to a third hardware queue.

18. The method of claim 17, further comprising storing each fragment of the first packet having the first priority level in a first memory region; and storing each fragment of the first packet having the second priority level in a second memory region.

19. The method of claim 18, further comprising:
determining that the entirety of a third packet of the multiple packets has the first-second priority level, as indicated by the flow identifier of the third packet;
maintaining the third packet in undivided form; and
storing the third packet in the second memory region.

20. The method of claim 19, further comprising storing the second packet in the first memory region.

* * * * *